US011609211B2

(12) United States Patent
Cha et al.

(10) Patent No.: US 11,609,211 B2
(45) Date of Patent: Mar. 21, 2023

(54) OBJECT RECOGNITION APPARATUS

(71) Applicant: KOREA INSTITUTE OF SCIENCE AND TECHNOLOGY, Seoul (KR)

(72) Inventors: Youngsu Cha, Seoul (KR); Jae Hoon Chung, Seoul (KR); Yonghwan Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 83 days.

(21) Appl. No.: 17/096,092

(22) Filed: Nov. 12, 2020

(65) Prior Publication Data
US 2021/0364478 A1  Nov. 25, 2021

(30) Foreign Application Priority Data

May 25, 2020  (KR) ......................... 10-2020-0062387

(51) Int. Cl.
*G01N 29/24* (2006.01)
*G01N 29/11* (2006.01)
*B25J 13/08* (2006.01)

(52) U.S. Cl.
CPC ......... *G01N 29/2437* (2013.01); *G01N 29/11* (2013.01); *B25J 13/087* (2013.01); *G06F 2218/12* (2023.01)

(58) Field of Classification Search
CPC .............. G01N 29/2437; G01N 29/11; G06K 9/00536; B25J 13/087; B25J 15/009
See application file for complete search history.

(56) References Cited

U.S. PATENT DOCUMENTS

| | | | | |
|---|---|---|---|---|
| 3,609,415 | A | * 9/1971 | Kawada | ................ H01L 41/044 |
| | | | | 310/318 |
| 6,193,303 | B1 | * 2/2001 | Urushiyama | ......... B60R 21/017 |
| | | | | 296/187.1 |
| 9,618,497 | B2 | 4/2017 | Shih et al. | |
| 10,018,034 | B2 | 7/2018 | Chronister | |
| 2011/0138915 | A1 | 6/2011 | Mutharasan et al. | |
| 2018/0162556 | A1 | * 6/2018 | Belk | ...................... C06B 33/00 |
| 2019/0178764 | A1 | 6/2019 | Pelssers et al. | |

FOREIGN PATENT DOCUMENTS

| | | | |
|---|---|---|---|
| JP | S6454225 | A | 3/1989 |
| JP | H05028653 | Y2 | 7/1993 |
| JP | 2007268620 | A | 10/2007 |
| KR | 1020150019293 | A | 2/2015 |
| KR | 1020170040071 | A | 4/2017 |

* cited by examiner

*Primary Examiner* — Tarun Sinha
(74) *Attorney, Agent, or Firm* — Rabin & Berdo, P.C.

(57) ABSTRACT

The present disclosure provides an object recognition apparatus, which includes: an actuator unit configured to contact an object and generate vibrations and transmit them through objects based on the inherent characteristic of the object; and a sensor unit connected to the actuator unit to receive the vibration and generate a voltage signal.

6 Claims, 9 Drawing Sheets

OBJECT RECOGNITION APPARATUS

CROSS-REFERENCE TO RELATED APPLICATION

This application claims priority to Korean Patent Application No. 10-2020-0062387, filed on May 25, 2020, and all the benefits accruing therefrom under 35 U.S.C. § 119, the contents of which in its entirety are herein incorporated by reference.

BACKGROUND

1. Field

The present disclosure relates to an object recognition apparatus, and more particularly, to an object recognition apparatus that recognizes an object using a piezoelectric/inverse piezoelectric effect of a piezoelectric element.

[Explanation of national research and development support]

This research is supervised by the ERICA Industry-Academic Cooperation Foundation of Hanyang University and supported by the robot industry core technology research and development (R&D) (Development of robot work control technology capable of gripping and manipulating various objects in daily life environment and working with tools based on multimodal recognition, No. 1415167974) of Korea Institute of Industrial Technology Evaluation, the Ministry of Trade, Republic of Korea.

2. Description of the Related Art

Object recognition belongs to a field of pattern recognition, and particularly refers to discriminating a target object based on information through visual, auditory and tactile sensors. Broadly, object recognition is being actively studied in the field of pattern recognition of artificial intelligence, especially in robotics. There is active research on a system that recognizes an object by comprehensively processing information through multiple sensors such as visual, auditory and tactile sensors.

As an example of an object recognition device, a device for analyzing a contact surface through vibration transmitted using an actuator and a sensor pair is known in the art.

In addition, as another example of the object recognition device, a device for using a sensor to measure a variation in displacement caused by an inverse piezoelectric effect and then measuring a compressive young's modulus and a shear modulus based on the measured variation is known.

However, the conventional object recognition device has a problem in that an object is not recognized by learning a signal obtained using a difference in transfer functions of a contact material according to frequencies.

RELATED LITERATURES

Patent Literature

Korean Unexamined Patent Publication No. 10-2015-0019293 (Feb. 25, 2015)

SUMMARY

The present disclosure is directed to providing an object recognition apparatus, which may recognize an object by learning a signal obtained using a difference in transfer functions of a contact material according to frequencies.

In one aspect, there is provided an object recognition apparatus, comprising: an actuator unit configured to contact an object and generate vibrations and transmit them through objects based on an inherent characteristic of the object; and a sensor unit set next to the actuator unit to receive the vibration and generate a voltage signal.

In an embodiment of the present disclosure, the actuator unit may include a piezoelectric film, and the piezoelectric film of the actuator unit may include: a piezoelectric member formed in a plate shape; and a conductive material disposed on one surface of the piezoelectric member and the other surface of the piezoelectric member opposite thereto.

Preferably, a shielding film configured to shield the piezoelectric film of the actuator unit from an external environment may be installed on the piezoelectric film of the actuator unit.

In addition, one surface of the piezoelectric film of the actuator unit may be grounded, a voltage source may be connected to the other surface of the piezoelectric film, and the voltage source may apply voltage maintaining sinusoidal difference between one surface and the other surface of the piezoelectric film.

In another embodiment of the present disclosure, the sensor unit may include a piezoelectric film, and the piezoelectric film of the sensor unit may include: a piezoelectric member formed in a plate shape; and a conductive material disposed on one surface of the piezoelectric member and the other surface of the piezoelectric member opposite thereto.

Preferably, a shielding film configured to shield the piezoelectric film of the sensor unit from an external environment may be installed on the piezoelectric film of the sensor unit.

In still another embodiment of the present disclosure, the object recognition apparatus of the present disclosure may further comprise a substrate film configured to fix initial states of the piezoelectric films of the actuator unit and sensor unit.

DETAILED DESCRIPTION

Hereinafter, the embodiments disclosed in this specification will be described in detail. Here, identical or similar components are denoted by identical or similar reference symbols and not described in detail again. In the following description, the word "unit" used in terms is selected or endowed only in consideration of ease naming and does not have any distinguishable meaning or role. In addition, in the following description of the embodiments of the present disclosure, any detailed description of related arts can be omitted if it is determined that the gist of the embodiments disclosed herein can be obscured by the same. Moreover, it should be understood that the accompanying drawings are just for better understanding of the embodiments disclosed herein and are not to be construed as limiting the scope of the present disclosure. The scope of the present disclosure should be understood as including all changes, equivalents and alternatives thereof.

Terms having an ordinal such as "first" and "second" can be used for explaining various components, but the components are not limited by the terms. These terms are just used for distinguishing any component from another.

In case it is mentioned that any component is "connected" to another component, the component may be connected directly to another component, but it should be understood that any other component can be further interposed between them.

The singular expressions are intended to include the plural forms as well, unless the context clearly indicates otherwise.

In this specification, the term such as "include" and "have" is just to specify the presence of features, integers, steps, operations, elements, parts or components thereof, stated in the specification, but does not preclude the presence or addition of one or more other features, integers, steps, operations, elements, parts or components thereof.

Figure 1:
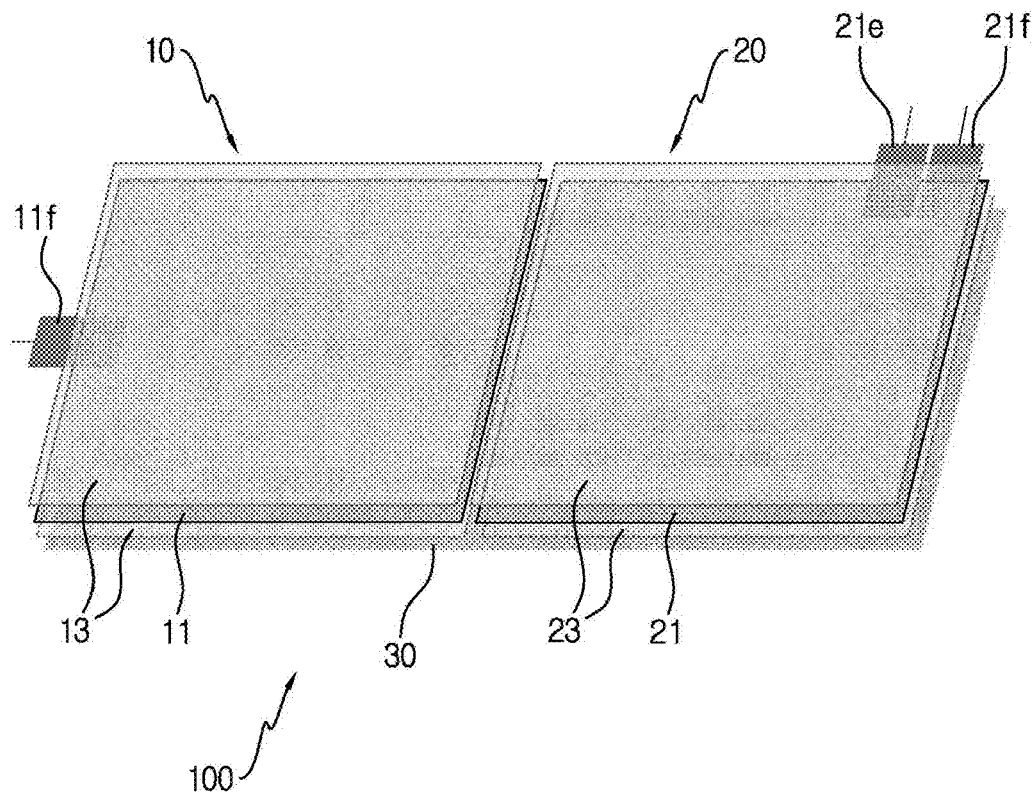
FIG. 1 is a perspective view conceptually showing an object recognition apparatus of the present disclosure.
Figure 2:
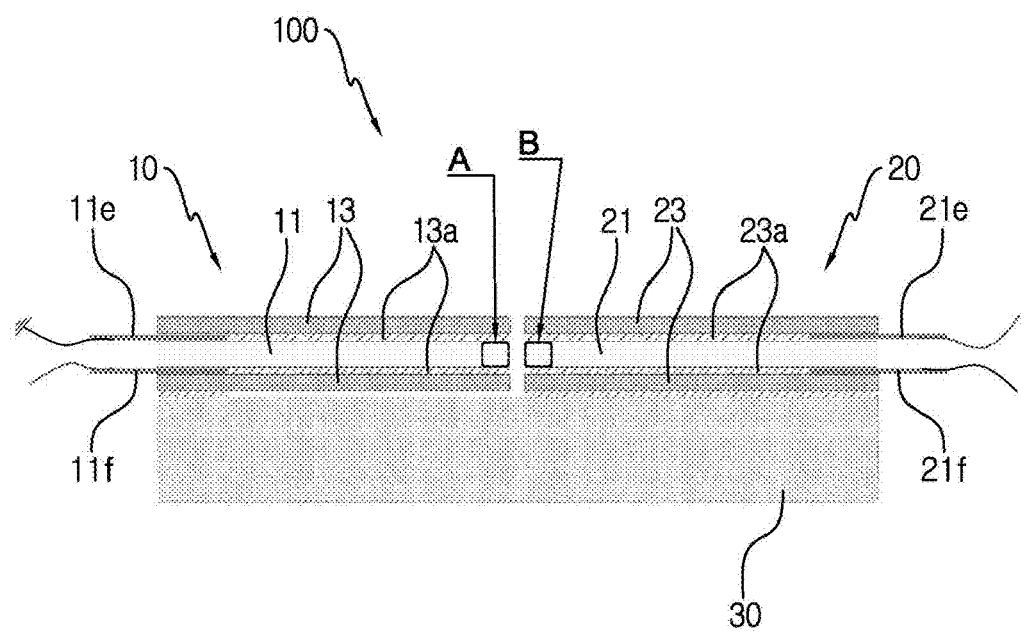
FIG. 2 is a sectional view showing the object recognition apparatus of the present disclosure.
Figure 3A:
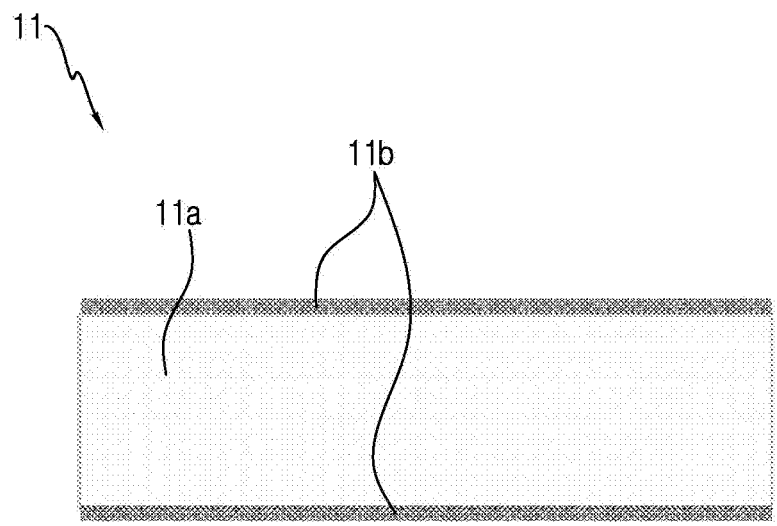
FIG. 3A is an enlarged view showing a portion A of FIG. 2.
Figure 3B:
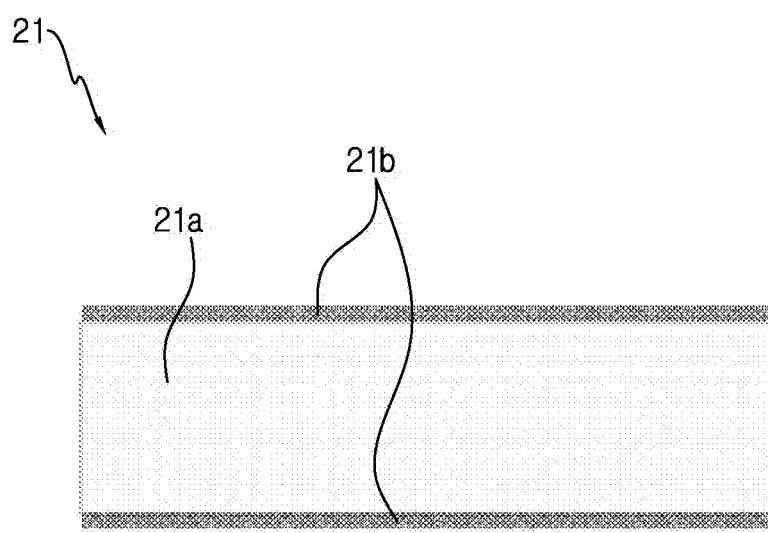
FIG. 3B is an enlarged view showing a portion B of FIG. 2.
Figure 4:
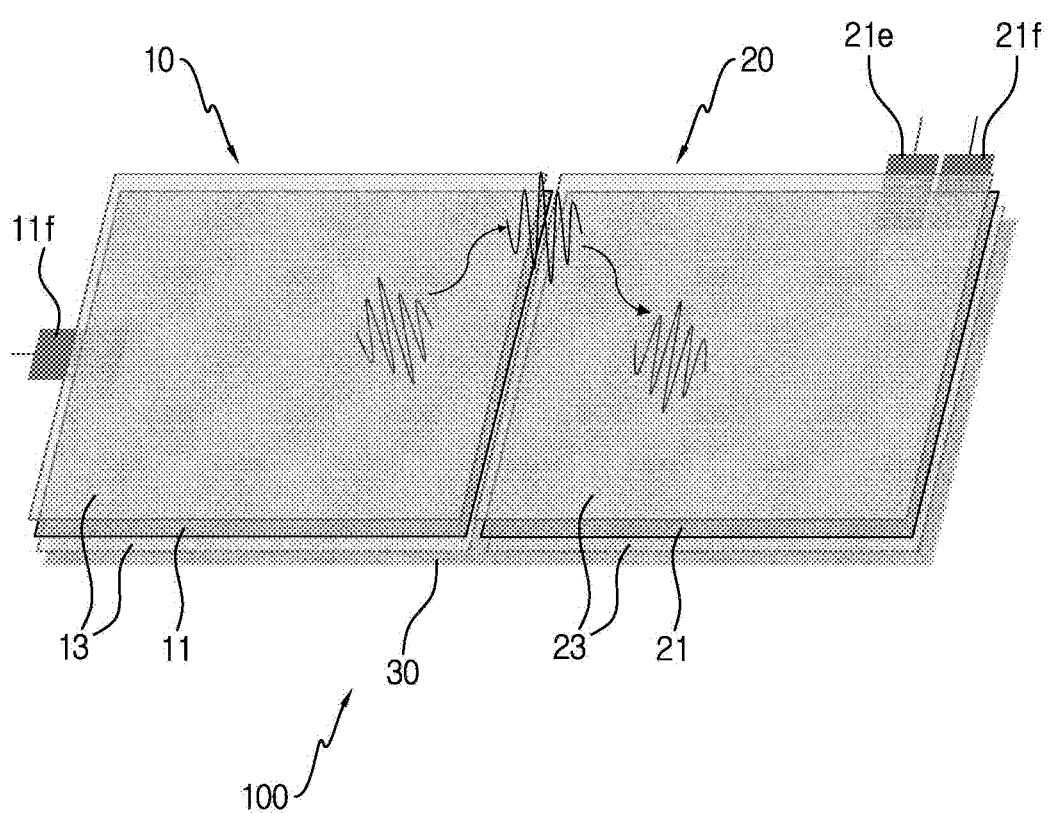
FIG. 4 is a conceptual diagram showing an operation of the object recognition apparatus of the present disclosure.
Figure 5A:
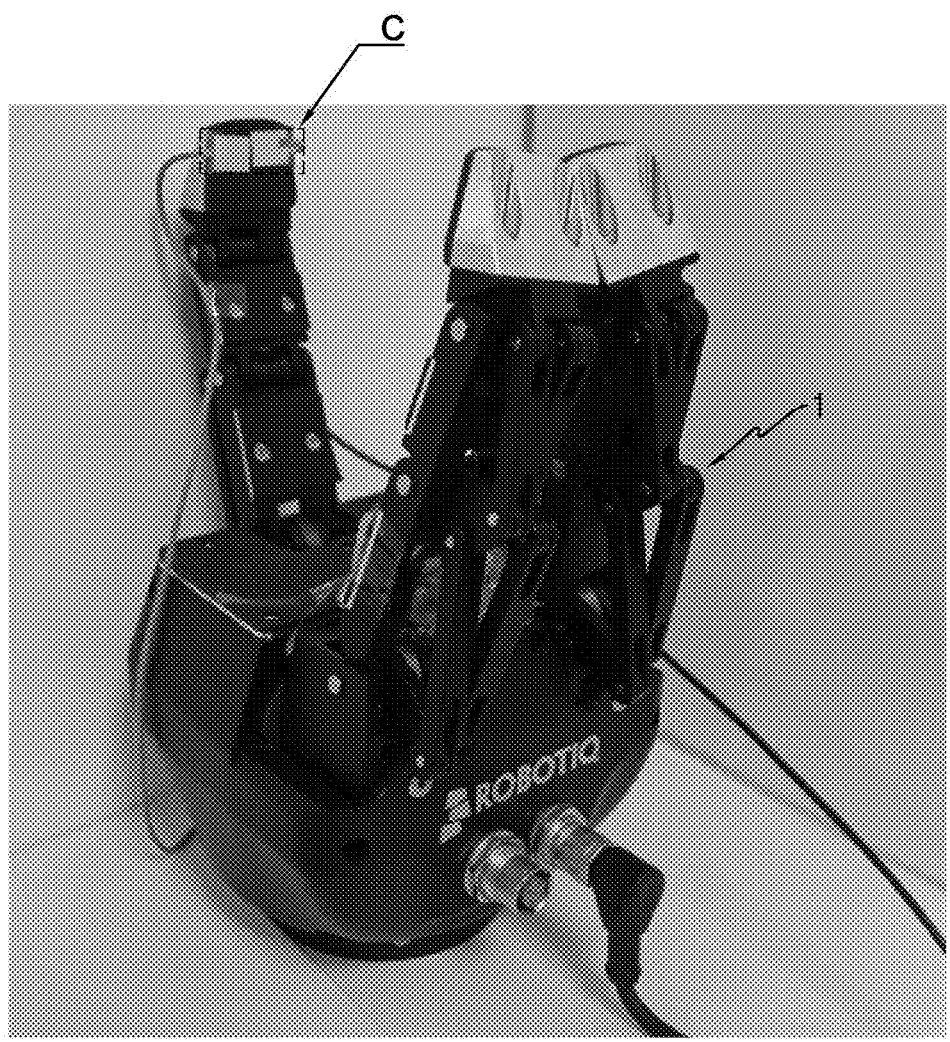
FIG. 5A is a photograph showing an example where the object recognition apparatus of the present disclosure is attached to a robot hand.
Figure 5B:
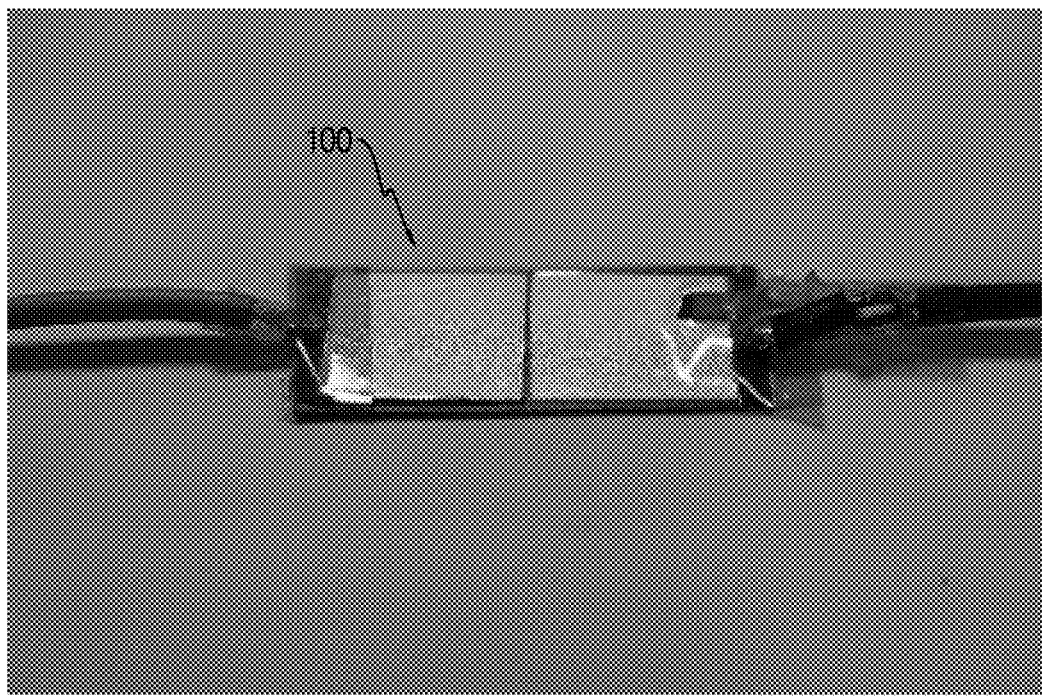
FIG. 5B is an enlarged view showing a portion C of FIG. 5A.
Figure 6A:
FIG. 6A is a photograph showing another example where the object recognition apparatus of the present disclosure is attached to the robot hand.
Figure 6B:
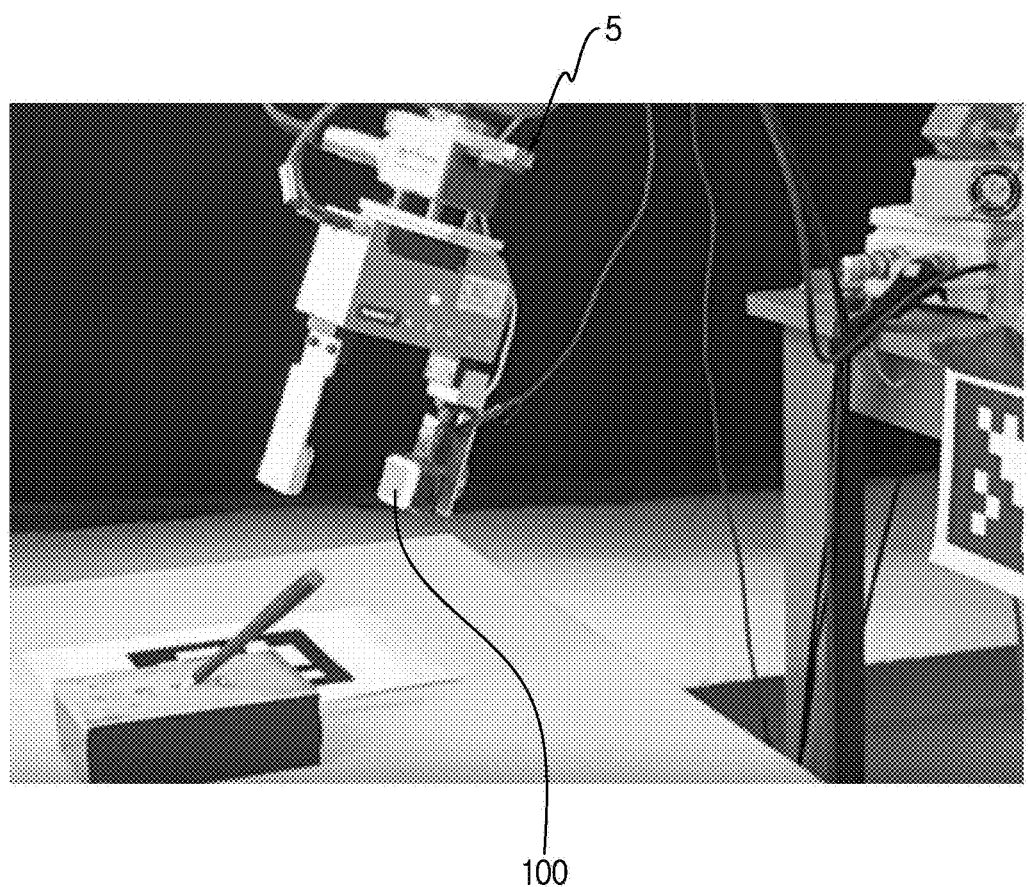
FIG. 6B is a photograph showing an example where the object recognition apparatus of the present disclosure is attached to an artificial hand manipulation instrument.

FIG. 1 is a perspective view conceptually showing an object recognition apparatus 100 of the present disclosure, FIG. 2 is a sectional view showing the object recognition apparatus 100 of the present disclosure, FIG. 3A is an enlarged view showing a portion A of FIG. 2, and FIG. 3B is an enlarged view showing a portion B of FIG. 2.

Referring to FIGS. 1 to 3B, the structure of the object recognition apparatus 100 of the present disclosure will be described.

In the present disclosure, the piezoelectric effect refers to a phenomenon in which when a force is applied to a piezoelectric material, polarization occurs in the material since the arrangement of electric dipoles inside the material generate a dipole moment.

In addition, in the present disclosure, the inverse piezoelectric effect refers to a phenomenon in which, as opposed to the piezoelectric effect, when an electric field is applied to a piezoelectric material, the molecule crystal mechanically deforms, so that the material lengthens or shortens depending on the direction of polarization.

The object recognition apparatus 100 of the present disclosure may include an actuator unit 10 and a sensor unit 20.

The actuator unit 10 generates vibration. The actuator unit 10 contacts an object and transmits the vibration through the object based on an inherent characteristic of the object.

The actuator unit 10 may include a piezoelectric film 11. If a voltage is applied to the piezoelectric film 11 provided in the actuator unit 10 and when the piezoelectric film 11 contacts with an object, the piezoelectric film 11 generates vibration by an inverse piezoelectric effect and transmit the vibration through the contacted object.

The piezoelectric film 11 of the actuator unit 10 includes a piezoelectric member 11a formed in a thin plate shape, and a conductive material 11b thinly coated on one surface of the piezoelectric member 11a and the other side of the piezoelectric member 11a opposite thereto, and one surface and the other surface of the piezoelectric film 11 are subjected to electric field orientation (poling) so that the piezoelectric film 11 becomes a piezoelectric film. Referring to FIG. 3A, the piezoelectric member 11a and the conductive material 11b are shown in an enlarged form.

For example, the piezoelectric member 11a may be polyvinylidene fluoride (PVDF). If the piezoelectric member 11a is polyvinylidene fluoride, the piezoelectric member 11a has high flexibility and thus has good availability as the piezoelectric film 11.

As described above, since the upper and lower surfaces of the piezoelectric film 11 are coated with the conductive material 11b, the voltage between the upper and lower surfaces may be affected by external conditions. Therefore, a shielding film 13 may be installed on the upper and lower surfaces of the piezoelectric film 11.

The shielding film 13 may shield the upper and lower surfaces of the piezoelectric film 11 from external environments. For example, the shielding film 13 may be an elastomer film (PET, polyethylene terephthalate).

A voltage may be applied to the upper and lower surfaces of the piezoelectric film 11 of the actuator unit 10. For example, FIG. 2 shows an example where the upper portion of the piezoelectric film 11 is grounded and the voltage source is connected to the lower portion of the piezoelectric film 11.

The voltage difference between the upper and lower surfaces at the actuator unit 10 may be maintained as sinusoidal signals. In addition, when the voltage is applied to the actuator unit 10 while changing the frequencies of sinusoidal signals, the actuator unit 10 vibrates according to the frequency of the sinusoidal signals by the inverse piezoelectric effect, and the generated vibration is transmitted to the sensor unit 20.

Since each object making contact with the actuator unit 10 has a different inherent characteristic, the response to vibration is different depending on the frequencies.

The vibration generated by the actuator unit 10 is transmitted to the sensor unit 20, explained later.

Referring to FIG. 2, electrodes 11e, 11f are respectively installed at the upper and lower surfaces of the piezoelectric film 11. In FIG. 2, the electrode 11e of the upper surface of the piezoelectric film 11 is grounded, and a voltage source is connected to the electrode 11f of the lower surface of the piezoelectric film 11. Thus, if a current is supplied, a voltage difference is generated between the upper and lower surfaces of the piezoelectric film 11.

The sensor unit 20 is connected to the actuator unit 10 to receive the vibration and generate a voltage signal.

The sensor unit 20 may include a piezoelectric film 21. The piezoelectric film 21 provided to the sensor unit 20 receives the vibration generated by the actuator unit 10 without any supply voltage and generates a voltage by the piezoelectric effect.

The piezoelectric film 21 is electrically neutral when no force is applied, and polarization of the piezoelectric film 21 may be changed by the piezoelectric effect when a mechanical force is applied thereto.

The piezoelectric film 21 of the sensor unit 20 includes a piezoelectric member 21a formed in a thin plate shape, and a conductive material 21b thinly coated on one surface of the piezoelectric member 21a and the other surface of the piezoelectric member 21a opposite thereto, thereby becoming a film with piezoelectric properties.

For example, the piezoelectric member 21a may be polyvinylidene fluoride (PVDF). If the piezoelectric member 21a is polyvinylidene fluoride, the piezoelectric member 21a has high flexibility and thus has good availability as the piezoelectric film 21.

Since the upper and lower surfaces of the piezoelectric film 21 are coated with the conductive material 21b as described above, the voltage between the upper and lower surfaces may be affected by external conditions. Therefore, a shielding film 23 may be installed on the upper and lower surfaces of the piezoelectric film 21.

The shielding film 23 may shield the upper and lower surfaces of the piezoelectric film 21 from external environments. For example, the shielding film 23 may be an elastomer film (PET, polyethylene terephthalate).

Referring to FIG. 2, electrodes 21e, 21f are installed on the upper and lower surfaces of piezoelectric film 21, respectively. If the vibration generated at the actuator unit 10 is transmitted to the sensor unit 20, a voltage difference is generated between the electrode 21e of the upper surface of the piezoelectric film 21 and the electrode 21f of the lower surface of the piezoelectric film 21 in FIG. 2.

The object recognition apparatus 100 of the present disclosure may further include a substrate film 30.

The substrate film 30 is configured to fix an initial state of the piezoelectric film 11 of the actuator unit 10 and the piezoelectric film 21 of the sensor unit 20. To this end, the substrate film 30 may be positioned under the actuator unit 10 and the sensor unit 20.

Referring to FIG. 2, an example where the substrate film 30 is positioned under the shielding film 13 of the actuator unit 10 and the shielding film 23 of the sensor unit 20 is shown.

The substrate film 30 prevents the inverse piezoelectric effect and the piezoelectric effect respectively generated by actuator unit 10 and sensor unit 20 from showing different patterns each time. The initial state of both the actuator unit 10 and the sensor unit 20 needs to be fixed, because there may be a limitation in obtaining a transfer function inherent to the object if the inverse piezoelectric effect and the piezoelectric effect respectively generated in the actuator unit 10 and the sensor unit 20 show different patterns every time.

Figure 7A:
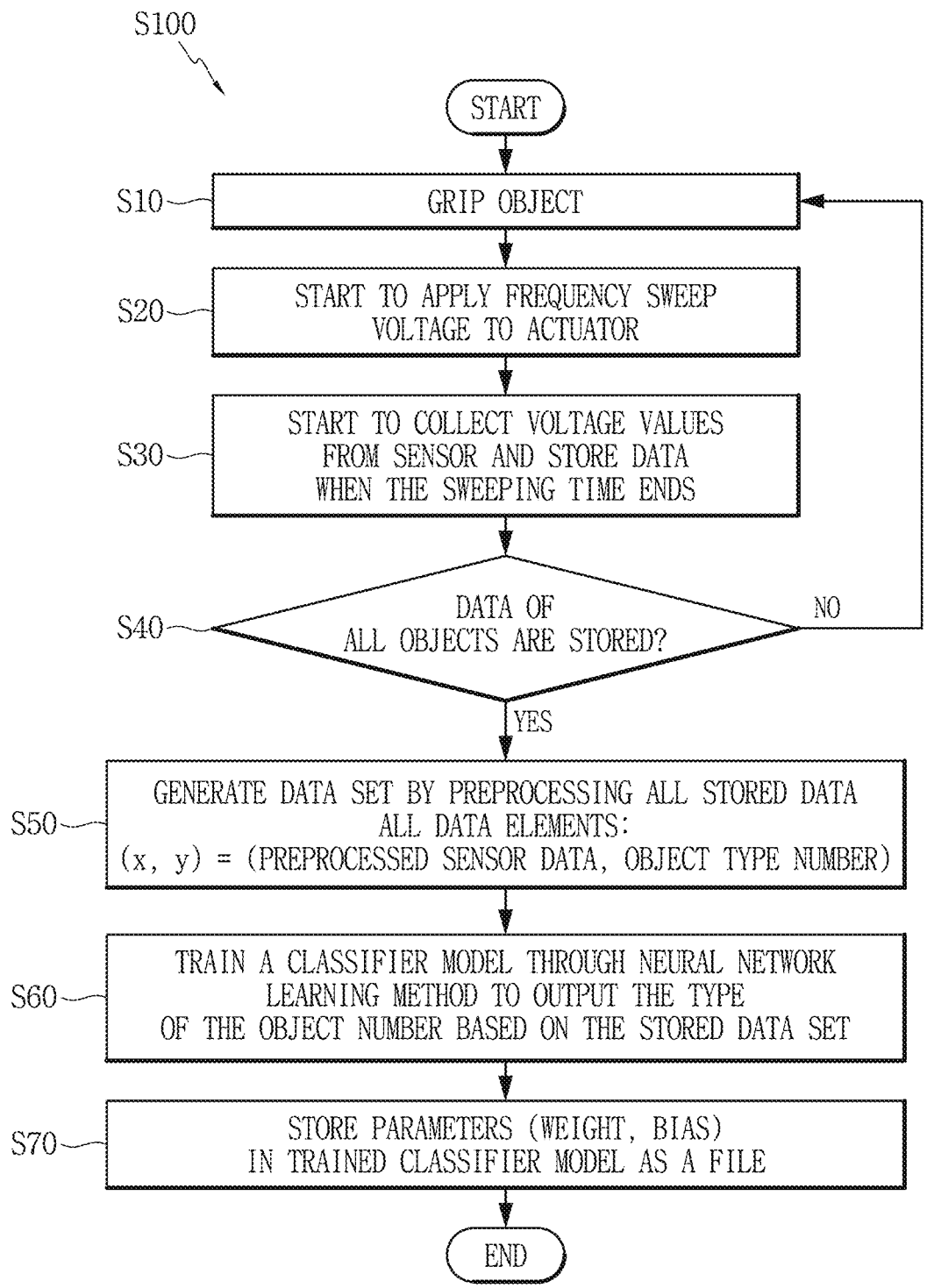
FIG. 7A is a flowchart for illustrating a machine learning step using the object recognition apparatus of the present disclosure.

Hereinafter, a machine learning step (S100) using the object recognition apparatus 100 of the present disclosure will be described with reference to FIG. 7A.

The machine learning step (S100) includes a step of gripping an object (S10), a step of supplying changing voltage to the actuator unit 10 (S20) by sweeping the frequencies, and a step of starting to collect voltage values from the sensor unit 20 and storing data when the sweeping time ends (S30).

After performing the steps S10 to S30, if data of all objects are stored (S40), the following steps are performed, but if data for all objects are not been stored yet, the steps S10 to S30 are performed again.

The machine learning step (S100) includes a step of generating a data set by preprocessing all stored data (S50), a step of training a classifier model through a neural network learning method to output the type of the object number-based on the data set (S60), and storing every parameters inside the trained classifier model as a file (S70).

In the step of generating a data set (S50), the elements of the data set include preprocessed sensor values (x) and the type number of the object (y).

In the step of learning through a neural network learning method (S60), sensor data 1 (x1, y1) may be input to the neural network model, and the type number may be derived as an output value. The process may pass an algorithm that automatically updates parameters inside the neural network model in order to reduce the difference between the type number of the object (y1) and the output value derived from the sensor data 1 through the neural network model.

In addition, in the step of learning through a neural network learning method (S60), sensor data 2 (x2, y2) may be input to the neural network model, and the type number may be derived as an output value. The process may pass an algorithm that automatically updates parameters inside the neural network model in order to reduce the difference between the type number of the object (y2) and the output value derived from the sensor data 2 through the neural network model.

If the above process is repeated for all data in the data set, the neural network model may have optimized parameter values for classifying objects.

In the step of storing parameters inside the learned neural network model as a file (S70), the parameters may include weight and bias values.

Figure 7B:
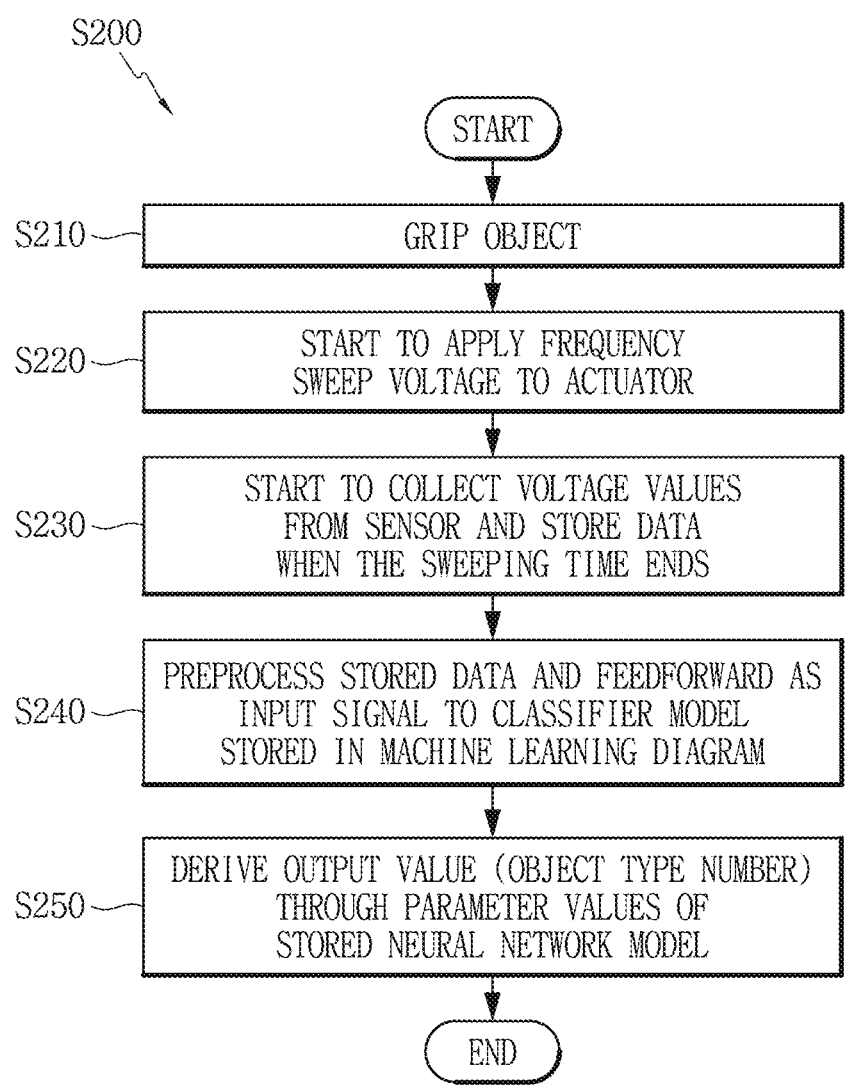
FIG. 7B is a flowchart for illustrating a step of classifying objects using the object recognition apparatus of the present disclosure.

Hereinafter, with reference to FIG. 7B, a step (S200) of classifying an object using the object recognition apparatus 100 of the present disclosure will be described. The step of recognizing an object (S200) includes a step of gripping an object (S210), a step of applying voltage to the actuator unit 10 (S220) while sweeping the frequencies, a step of starting to collect voltage values from the sensor unit 20 and storing the data when the sweeping time ends (S230), a step of preprocessing the stored data and then feedforward the preprocessed data as an input signal to the trained neural network model stored in the step S60 in the machine learning step S100 (S240), and a step of confirming the type of the object by deriving the output value based on the parameters of the stored neural network model (S250).

In the present disclosure, when gripping an object, sweeping the frequencies of vibrations by the actuator unit and obtaining a signal transmitted to the sensor make it possible to classify the object by learning the transfer function inherent to the object.

In addition, in the present disclosure, it is possible to classify the object through an actuator-sensor pair at the moment of gripping, without any exploratory procedure such as rubbing or slipping the object with a robot finger.

The object recognition apparatus 100 as described above is not limited to the configuration and method of the embodiments described above, but the embodiments may be modified in various ways by combining the embodiments entirely or selectively.

It will be apparent to those skilled in the art that the present disclosure can be embodied in other specific forms without departing from the essential characteristics of the present disclosure. Accordingly, the above detailed description should be considered in all respects as illustrative and not restrictive. The scope of the present disclosure shall be determined by rational interpretation of the appended claims, and all changes within the equivalence scope of the present disclosure shall fall within the scope of the present disclosure.

What is claimed is:

1. An object recognition apparatus, comprising:
an actuator unit configured to contact an object and generate a vibration based on an inherent characteristic of the object and to transmit the vibration through the object;
a sensor unit set aside from the actuator unit to receive the transmitted vibration through the object and generate a voltage signal; and
a substrate film configured to fix an initial state of a piezoelectric film of the actuator unit and a piezoelectric film of the sensor unit.

2. The object recognition apparatus according to claim 1,
wherein the actuator unit includes the piezoelectric film, and
wherein the piezoelectric film of the actuator unit includes:
a piezoelectric member formed in a plate shape; and
a conductive material disposed on one surface of the piezoelectric member and another surface of the piezoelectric member opposite to the one surface.

3. The object recognition apparatus according to claim 2,
wherein a shielding film configured to shield the piezoelectric film of the actuator unit from an external environment is installed on the piezoelectric film of the actuator unit.

4. The object recognition apparatus according to claim 2,
wherein one surface of the piezoelectric film of the actuator unit is grounded, a voltage source is connected to another surface of the piezoelectric film, and the voltage source applies voltage maintaining a sinusoidal difference between the one surface and the other surface of the piezoelectric film.

5. The object recognition apparatus according to claim 2,
wherein the sensor unit includes a piezoelectric film, and wherein the piezoelectric film of the sensor unit includes:
a piezoelectric member formed in a plate shape; and
a conductive material disposed on the one surface of the piezoelectric member and the other surface of the piezoelectric member.

6. The object recognition apparatus according to claim 5,
wherein a shielding film configured to shield the piezoelectric film of the sensor unit from an external environment is installed on the piezoelectric film of the sensor unit.

* * * * *